Aug. 4, 1925.

C. F. ZUKOSKI 1,548,084

DRAG BRAKE FOR VEHICLES

Filed June 9, 1924

3 Sheets-Sheet 1

WITNESS:

Herbert De Straelen

INVENTOR
CHARLES F. ZUKOSKI
BY J. Henry Kinealy,
ATTORNEY

Aug. 4, 1925.  1,548,084
C. F. ZUKOSKI
DRAG BRAKE FOR VEHICLES
Filed June 9, 1924   3 Sheets-Sheet 2

WITNESS:

INVENTOR
CHARLES F. ZUKOSKI
BY
ATTORNEY

Aug. 4, 1925.
C. F. ZUKOSKI
1,548,084
DRAG BRAKE FOR VEHICLES
Filed June 9, 1924   3 Sheets-Sheet 3
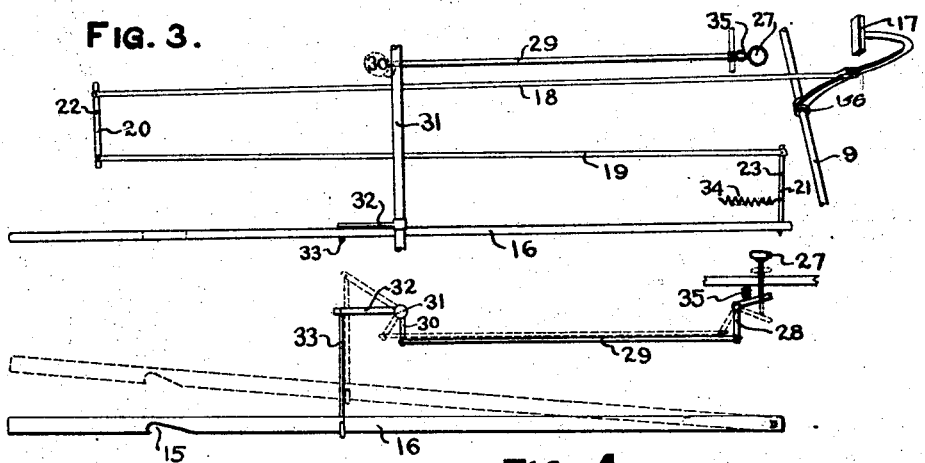
FIG. 3.
FIG. 4.
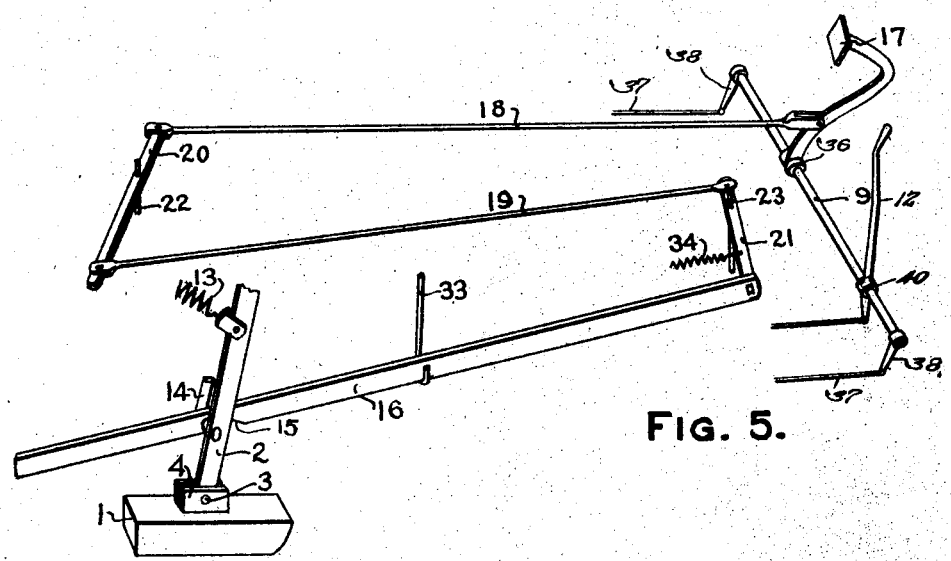
FIG. 5.
WITNESS:
INVENTOR
CHARLES F. ZUKOSKI
BY J Henry Kinealy
ATTORNEY Patented Aug. 4, 1925.

1,548,084

UNITED STATES PATENT OFFICE.

CHARLES F. ZUKOSKI, OF ST. LOUIS, MISSOURI.

DRAG BRAKE FOR VEHICLES.

Application filed June 9, 1924. Serial No. 718,819.

*To all whom it may concern:*

Be it known that I, CHARLES F. ZUKOSKI, a citizen of the United States, residing in the city of St. Louis, in the State of Missouri, have invented a new and useful Improvement in Drag Brakes for Vehicles, of which the following is a full, clear, and exact specification, reference being had to the accompanying drawings, which form a part thereof.

My invention relates to drag brakes for vehicles and more particularly to drag brakes for vehicles which have a service brake operated by a foot pedal or other convenient means.

The objects of my invention are to provide a drag brake for vehicles which will stop the vehicle without danger of skidding or sidesway; to provide a drag brake for vehicles which have an ordinary service brake thereon acting in cooperation with the drag brake to stop the vehicle; and to provide a drag brake which will easily bring the vehicle to a sudden stop in an emergency.

Figure 1:
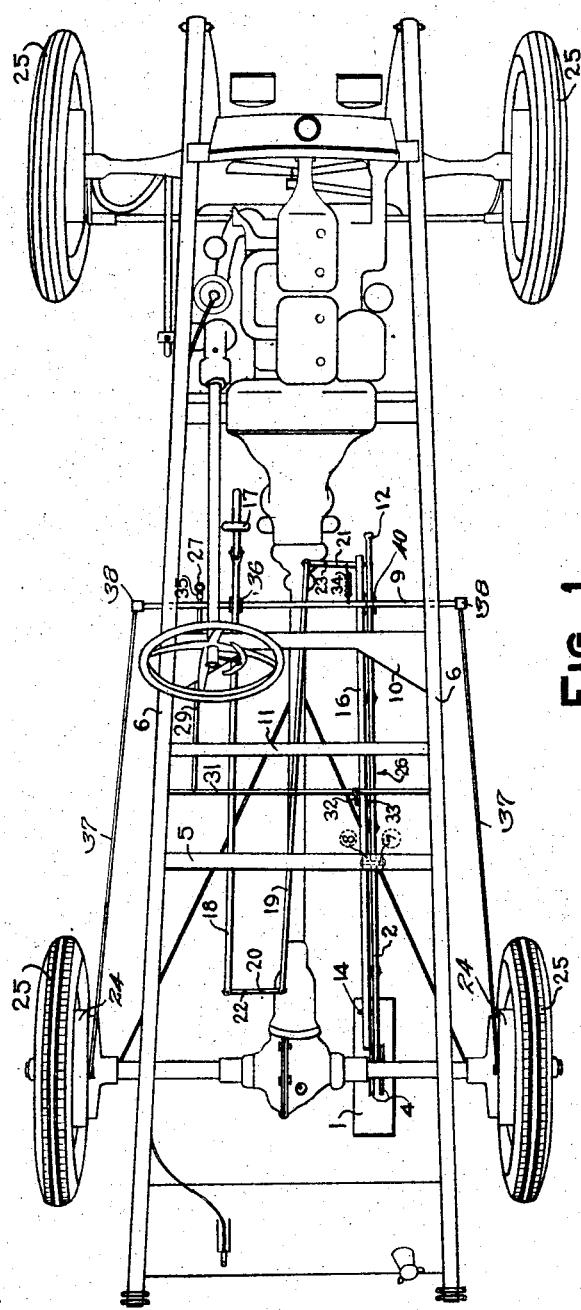
Figure 2:
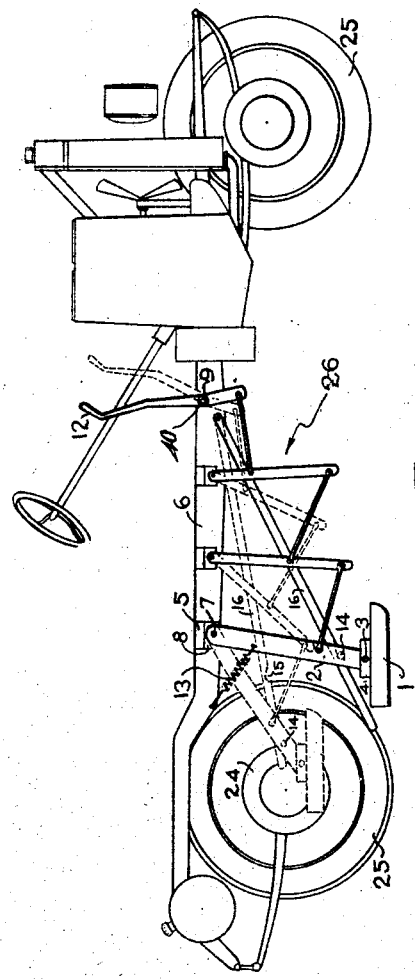

In the accompanying drawings, wherein similar numerals are used to designate similar parts, my new and improved drag brake is shown installed on an automobile. Fig. 1 is a plan view of the chassis of the automobile showing the drag brake attached thereon; Fig. 2 is a partial view of a cross section of the chassis showing the compound lever whereby the drag is moved into operative position; Fig. 3 is a plan view of a detail of construction of the device; Fig. 4 is an elevation of the parts shown in Fig. 3; and Fig. 5 is a diagrammatic perspective of the means for operating the drag to stop the automobile to which it is applied.

Referring to the figures the drag brake and the mechanism for operating it comprises the drag 1 which is pivotally attached to the lower end of a supporting arm 2 by means of a bolt 3 passing through the supporting arm 2 and the blocks 4 arranged on the upper side of the drag. The supporting arm 2 is, in turn, swingably mounted at its upper end on the transverse bar 5, which is arranged between the side members 6 of the chassis frame of the automobile, as shown in Fig. 2, by means of the bolt 7 passing through the supporting arm 2 and the blocks 8 secuerd to and extending downwardly from the transverse bar 5. A compound lever 26, the various parts of which are pivotally attached to the transverse members 9, 10 and 11, which is actuated by the hand lever 12 is provided to move the drag and carrying arm from inoperative position, into operative position close to the ground, all as shown in Fig. 2. The hand lever 12 is provided with a boss 40 which is journaled on the transverse member 9, as shown in Fig. 2. The drag and carrying arm are, preferably, ordinarily maintained in inoperative position by the spring 13.

When the drag is moved into operative position the pin 14 on the carrying arm 2 automatically comes into engagement with the notch 15 in the tension rod 16. The tension rod 16, by means hereinafter described, is moved longitudinally by a forward movement of the pedal 17. The pedal 17 is provided at its lower end with a boss 36 which is pinned to the shaft 9, as shown in Fig. 5, so that a forward movement of the pedal will turn the transverse member 9 through part of a revolution, which movement will move the ends of the arms 38 extending downwardly at each end of the transverse member 9 and, in turn, move the brake rods 37 to apply the service brakes 24 on the rear wheels. The mechanism for transmitting motion from the pedal 17 to the tension rod 16 is shown diagrammatically in Fig. 5, and comprises the connecting links 18 and 19 and the rods 20 and 21 which are pivotally mounted on the pins 22 and 23 carried by the floor boards of an automobile body mounted on the chassis or by any other convenient members. The tension rod 16 is pivotally mounted on the end of the rod 21 opposite the end to which is attached the connecting link 19. By this arrangement of mechanism when the pedal 17 is moved forward the motion is transmitted therefrom through the connecting links and rods, as described, to move the tension rod 16 forward and, since the notch 15 in the tension rod is in engagement with the pin 14 on the carrying arm 2, the drag will be made to bear against the ground to stop the automobile. The pins 22 and 23 are, preferably, offset from the middle of the rods 20 and 21, as shown in Fig. 5, so that a movement of the pedal 17 will result in a much greater longitudinal movement of the tension rod 16.

The mode of operation of the drag brake to stop an automobile to which it is attached is as follows:—The carrying arm 2 and the drag 1 on the end thereof are moved downwardly, by means of movement of the hand lever 12 transmitted through the compound lever 26, from inoperative position into operative position close to the ground in which position the pin 14 automatically comes into engagement with the notch 15 in the tension rod 16. When the drag and carrying arm are in inoperative position the rear end of the tension rod 16 rests on the pin 14, as shown in Fig. 2. When it is desired to stop the automobile the brake pedal 17 is moved forward in the usual way and this forward motion of the pedal is transmitted through the connecting links 18 and 19 and the pivoted rods 20 and 21 to move the tension rod 16 forward, as described above, and, since the notch 15 in the tension rod is in engagement with the pin 14 on the carrying arm 2, this movement of the tension rod will move the drag 1 downwardly and forwardly to bear against the ground. Since, as is described above, the pedal 17 also applies the ordinary service brakes of the automobile, the drag is operated to bear against the ground simultaneous with the application of the service brakes. A spring 34 may be provided to return the pedal to normal position after application of the brakes. The brake surface of the automobile is increased by the area of the bottom surface of the drag 1 and hence the automobile will be quickly and easily brought to a stop. The comparatively broad contact surface of the drag 1 prevents turning or lateral movement of the automobile, thereby effectually preventing skidding. Suitable lateral braces not shown on the drawings to avoid confusion may be provided when necessary between the chassis frame and the carrying arm 2.

When it is desired to release the drag brake and to cause the drag 1 and the carrying arm 2 to return to inoperative position the trip 27 is depressed thereby moving the bell crank 28 rearwardly and this movement transmitted through the rod 29 and the lug 30 rotates the shaft 31 through a partial turn and the finger 32 and the link 33 pivotally attached to the end thereof are raised, all as shown in Figs. 3 and 4. The link 33 has a hook arranged on the lower end thereof which hook is in engagement with the tension rod 16, as shown in Fig. 4, whereby when the link is moved upwardly by the finger 32, it carries the tension rod 16 upwardly and thereby moves the notch 15 out of engagement with the pin 14 allowing the spring 13 to move the carrying arm 2 and drag 1 into inoperative position, as shown in Fig. 2. When pressure on the trip 27 is removed the trip is forced upwardly by the spring 35.

I fully realize that the connecting means for transmitting motion between the various parts and the size, shape and arrangement of the parts themselves may be varied within wide limits without deviating from the spirit of my invention.

What I claim as new and desire to secure by Letters Patent, is:—

1. In a vehicle having a service brake and means for operating said service brake, a drag brake comprising a drag swingably mounted beneath the chassis frame of said vehicle and arranged to be maintained in inoperative position, means for moving said drag into operative position close to the ground, and means whereby said drag brake is operated by the operating means of said service brake to stop said vehicle.

2. In a vehicle having a service brake and a pedal with complementary connections for operating said service brake, a drag brake comprising a drag, a supporting arm for said drag swingably mounted to extend downwardly beneath the chassis frame of said vehicle, and means whereby said drag brake is operated by said pedal simultaneous with the application of said service brake to stop said vehicle.

3. In a vehicle having a service brake and a pedal with complementary connections thereto for operating said service brake, a drag brake comprising a drag, a supporting arm for said drag swingably mounted to extend downwardly beneath the chassis frame of said vehicle, means for moving said drag into operative position close to the ground, and means whereby said drag brake is operated by said pedal simultaneous with the application of said service brake to stop said vehicle.

4. In a vehicle having a service brake and operating means for said service brake, a drag brake comprising a drag, a supporting arm for said drag swingably mounted beneath the frame of said vehicle, and means whereby said drag is operated by said operating means for said service brake simultaneous with the application of said service brake to stop said vehicle.

5. In a vehicle having a service brake and a pedal with complementary connections thereof for operating said service brake, a drag brake comprising a drag, a supporting arm for said drag swingably mounted to extend downwardly beneath the chassis frame of said vehicle, a compound lever for moving said drag into operative position close to the ground, and means whereby said drag is operated by said pedal simultaneous with the application of said service brake to stop said vehicle.

6. In a vehicle having a service brake and a pedal with complementary connections thereof for operating said service brake, a drag brake comprising a drag, a supporting arm for said drag swingably mounted to extend downwardly beneath the chassis frame of said vehicle, means for maintaining said drag in inoperative position, a compound lever for moving said drag into operative position close to the ground, a tension rod adapted to be automatically connected to said arm when said drag is in operative position, and means whereby movement of said pedal is transmitted to move said tension rod whereby said drag brake is operated simultaneous with the application of said service brake to stop said vehicle.

In witness whereof I have signed my name to this specification.

CHARLES F. ZUKOSKI.